United States Patent [19]

Martin et al.

[11] Patent Number: 5,722,641
[45] Date of Patent: Mar. 3, 1998

[54] VEHICLE MOUNTED TIRE CHANGING SYSTEM

[76] Inventors: Angela Martin; Robert Richardson, both of 2920 Theresa Ave., Las Vegas, Nev. 89101-1666

[21] Appl. No.: 564,866

[22] Filed: Nov. 30, 1995

[51] Int. Cl.$^6$ .................................................. B66F 3/24
[52] U.S. Cl. .................................... 254/423; 254/DIG. 1
[58] Field of Search .............................. 254/418, 423, 254/420, 93 H, 1, DIG. 1, DIG. 4

[56] References Cited

U.S. PATENT DOCUMENTS

| | | | |
|---|---|---|---|
| 1,192,611 | 7/1916 | Field | 254/DIG. 1 |
| 2,885,181 | 5/1959 | McCully et al. | 254/420 |
| 4,706,937 | 11/1987 | Chung | 254/93 H |
| 4,993,688 | 2/1991 | Mueller et al. | 254/423 |
| 5,219,429 | 6/1993 | Shelton | 254/423 |
| 5,224,688 | 7/1993 | Torres et al. | 254/423 |
| 5,232,206 | 8/1993 | Hunt et al. | 254/423 |
| 5,377,957 | 1/1995 | Mosley | 254/423 |

*Primary Examiner*—Robert C. Watson
*Attorney, Agent, or Firm*—Joseph N. Breaux

[57] ABSTRACT

A vehicle mounted tire changing system is provided of the type having a hydraulic jack system connected to a vehicle for lifting a portion of the vehicle relative to the supporting terrain and a pneumatic system carried by the vehicle for connecting air operated tools. The vehicle mounted tire changing system comprises: a plurality of hydraulic jacks mounted to a vehicle in a substantially vertical orientation relative to the supporting terrain; a hydraulic power unit coupled in communication with the hydraulic jacks for providing a hydraulic fluid under pressure to actuate the hydraulic jacks; a hydraulic manifold having valve assemblies coupled in fluid communication between the jacks and the hydraulic power means; a control unit for selectively activating the valve assemblies; an air compressor electrically connected to a battery via a switch for selectively operating the air compressor; a pair of air hoses each having a first end in fluid communication with the air compressor and a second end carrying an air tool connector for operably connecting air operated tools thereto, the connectors are connected to opposite sides of the vehicle. The hydraulic jack having an outer cylinder for mounting to the vehicle, an inner rod having a distal end, the inner rod operable to be hydraulically extended from and retracted into the outer cylinder and a base connected to the distal end of the inner rod.

9 Claims, 2 Drawing Sheets

VEHICLE MOUNTED TIRE CHANGING SYSTEM

TECHNICAL FIELD

The present invention relates to devices for changing tires on a vehicle and more particularly to devices for changing a tire on a vehicle that includes a vehicle mounted jacking system and pneumatic system for operating air powered tools.

BACKGROUND ART

Vehicles such as trucks and cars may be equipped with attached, self-contained or integrated jacking systems. The most common use of such jacks is to elevate one side of the car or truck for removal and replacement of a flat tire. Before the integrated jacking systems, a portable, manually operable jack matched to the specific type of vehicle was provided. The operator would normally remove the jack from its storage position and attach the jack to the vehicle's frame. The operator would then manually crank the jack to free the flat tire from contact with the ground. Subsequently, the operator would remove the tire using tools such as a tire tool or spider wrench and replace the tire in the same manner.

Occasionally, portable jacks may be lost and are not available for service. At other times the jack may be stored in a trunk under luggage, requiring the trunk to be unloaded. In still other times, a vehicle may have a flat lowering the vehicle to such a degree that a portable jack cannot be place under the vehicle. Further, when rotating the tires it is time consuming and difficult to raise the vehicle and remove a first tire, lower the vehicle then raise another portion of the vehicle, remove a second tire and replace it with the first tire and then repeating the process until all of the tires have been rotated.

It would be a benefit, therefore, to have a system mounted to a vehicle for selective elevating a portion of the vehicle or the entire vehicle. It would be a further benefit, to have a system that has a base connected to a jack that will securely contact a supporting terrain that is not level or that is loose. It would be an additional benefit, to have a system that allows for air operated tools to be connected thereto.

GENERAL SUMMARY DISCUSSION OF INVENTION

It is thus an object of the invention to provide a vehicle mounted tire changing system that has a hydraulic jack system having a plurality of hydraulic jacks mounted to a vehicle for lifting a portion of the vehicle relative to the supporting terrain.

It is a further object of the invention to provide a vehicle mounted tire changing system that has a base connected to the jack that is pivotable relative to the jack.

It is a still further object of the invention to provide a vehicle mounted tire changing system that has retractable spikes extending downwardly from the base for engaging the supporting terrain.

It is a still further object of the invention to provide a vehicle mounted tire changing system that has a pneumatic system for connecting air operated tools.

Accordingly, a vehicle mounted tire changing system is provided of the type having a hydraulic jack system connected to a vehicle for lifting a portion of the vehicle relative to the supporting terrain and a pneumatic system carried by the vehicle for connecting air operated tools. The vehicle mounted tire changing system comprises: a plurality of hydraulic jacks mounted to a vehicle in a substantially vertical orientation relative to the supporting terrain; a hydraulic power unit coupled in communication with the hydraulic jacks for providing a hydraulic fluid under pressure to actuate the hydraulic jacks; a hydraulic manifold having valve assemblies coupled in fluid communication between the jacks and the hydraulic power means; a control unit for selectively activating the valve assemblies; an air compressor electrically connected to a battery via a switch for selectively operating the air compressor; a pair of air hoses each having a first end in fluid communication with the air compressor and a second end carrying an air tool connector for operably connecting air operated tools thereto, the connectors are connected to opposite sides of the vehicle. The hydraulic jack having an outer cylinder for mounting to the vehicle, an inner rod having a distal end, the inner rod operable to be hydraulically extended from and retracted into the outer cylinder and a base connected to the distal end of the inner rod.

The vehicle mounted tire changing system may be combined with various types of vehicles. The jacks may be mounted to the frame or chassis of the vehicle. A jack may be mounted approximate the front of the vehicle and another jack approximate the rear of the vehicle so that either the front or rear of the vehicle may be raised or the entire vehicle may be elevated. Preferably, a jack is mounted approximate each wheel assembly such that a portion of the vehicle may be elevated to replace a tire.

The control unit may be mounted with the cab of the vehicle. The control unit may be mounted in a trunk of the vehicle. The hydraulic power unit may include a pump and oil reservoir separate from the vehicle's power steering unit.

The base may include a foot member for engaging the supporting terrain elevating the vehicle. The foot member may be a planar member for dispersing the weight of the supported vehicle over a larger surface area on which the foot member contacts the supporting terrain.

In a preferred embodiment, the foot member includes side wall, a bottom section and a top section defining an interior therebetween. A plurality of tubes defining pathways therein, are vertically mounted within the interior between the top section and the bottom section and the bottom section forms a hole below each pathway. A retractable spike having an expanded end and a pointed end is movably disposed within the pathway. The expanded end is retained within the pathway by a shoulder formed about the hole below the pathway. An urging mechanism is disposed within the pathway of the tube between the top section and the expanded end of the retractable spike urging the pointed end of the retractable spike outwardly from the foot member. The urging means may be a spring, piston or any reciprocating device well known in the art.

The retractable spikes provided for added lateral support when the vehicle is elevated above an unstable surface. When a vehicle is elevated above a surface such as a lawn or the side of a road the spikes penetrate the soil adding lateral support to the raised vehicle. When a vehicle is elevated above a solid surface such as pavement the spike is urged into the foot member.

The base is connected to the distal end of the inner rod of the jack. In a preferred embodiment, the base is connected by a mechanical mechanism in a manner such that the base is pivotable relative to the longitudinal axis of the inner rod. Preferably, the base is pivotal around its periphery such that the base may securely contact the supporting terrain. The mechanical mechanism may be a be a U-joint type connector or a ball and socket type connector. Preferably, the mechanical mechanism is a ball and socket type connector.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
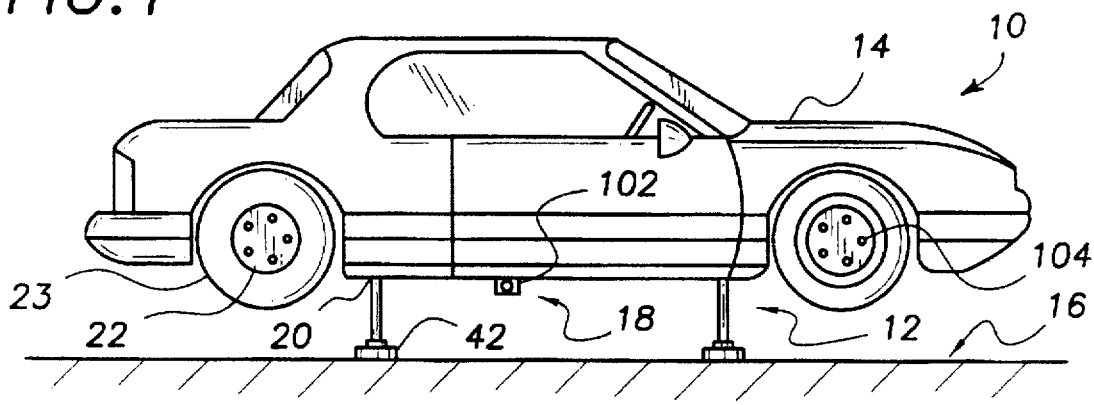
FIG. 1 is a side view of an exemplary embodiment of the vehicle mounted tire changing system of the present invention.

FIG. 1 is a side view of an exemplary embodiment of the vehicle mounted tire changing system of the present invention generally designated by the numeral 10. Tire changing system 10 includes a hydraulic jack system 12 for controllably raising and lowering a portion of a vehicle 14 relative to the terrain 16 on which vehicle 14 rests or is supported and a pneumatic system 18 for connecting and operating pneumatic tools (not shown).

Figure 2:
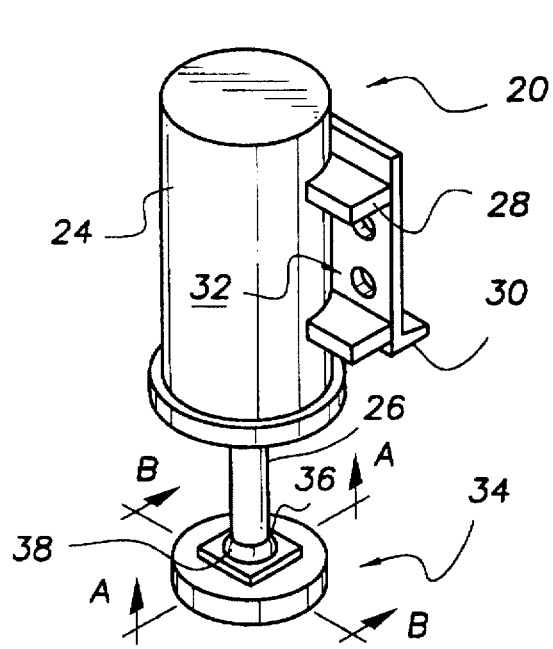
FIG. 2 is a perspective view of the hydraulic jack.

Referring to FIGS. 1 and 2, hydraulic jack system 12 includes four hydraulic jacks 20 each mounted approximate a ground engaging wheel 22 having a tire 23 thereon. Hydraulic jacks 20 are rigidly mounted to the frame (not shown) of vehicle 14. Each jack 20 being oriented in a substantially vertical orientation relative to terrain 16.

FIG. 2 is a perspective view of hydraulic jack 20. Hydraulic jack 20 includes an outer cylinder 24 which is substantially fluid tight and telescopically receives a first rod 26 operable to be hydraulically extended from and retracted into first outer cylinder 24. Inner rod 26 has a ball 38 extending from a distal end 36 thereof. A base 34 is pivotably connected to ball 38 in a manner such that base 34 is rotatable about ball 38 and pivotable relative to the longitudinal axis of inner rod 26.

A mounting bracket 28 having a lifting shelf 30 is connected to outer cylinder 24 by welding. Mounting bracket 28 forms apertures 32 for bolting jack 20 to the frame of vehicle 14 (not shown). Although not specifically illustrated, suitable hydraulic fluid lines are connectable to jack 20 from a pressurized fluid source which will hereinafter be described.

Figure 3:
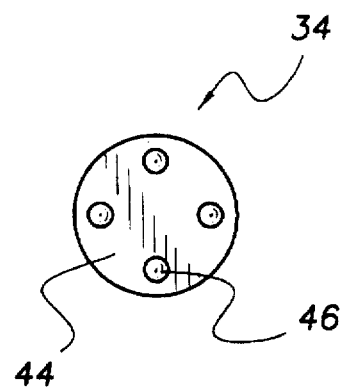
FIG. 3 is a bottom view of the base along the line A—A shown in FIG. 2, in isolation.

FIG. 3 is a bottom view of base 34 along the line A—A shown in FIG. 2, in isolation. Base 34 has a substantially planar bottom section 44. Four retractable spikes 56 movably extend downwardly from base 34 through bottom section 44 for engaging loose or permeable terrain 16 (FIG. 1).

Figure 4:
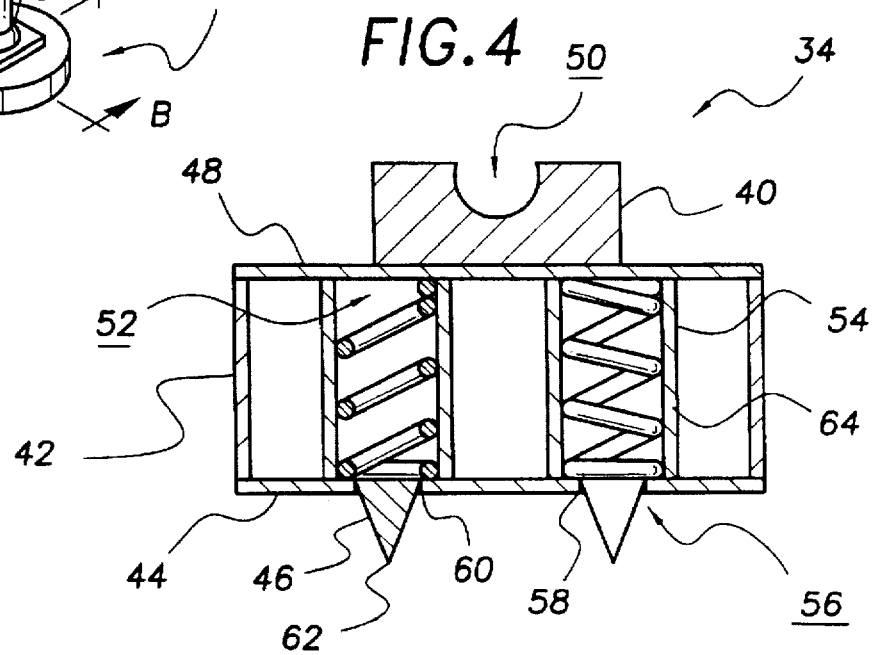
FIG. 4 is a cross-sectional, side view of the base along the line B—B shown in FIG. 2.

FIG. 4 is a cross-sectional, side view of base 34 along the line B—B shown in FIG. 2. Base 34 includes a socket member 40 and a foot member 42.

Foot member 42 is constructed of a metal piping forming a side wall having a top section 48 and bottom section 44 defining an interior therebetween. Socket member 44 is mounted atop top section 48 and forms a socket therein for rotatably disposing ball 38 (FIG. 2).

A metal tube 54 is mounted within foot member 42 for each spike 46. Tube 54 defines a vertical, cylindrical pathway 52 for movably disposing a spike 46 therein. A hole 56 is formed by bottom section 44 below each pathway 52 for disposing a spike 46 therethrough. Each spike 46 has an expanded end 60 movably held within pathway 52 for guiding spike 46 within pathway 52 and for resting atop shoulder 58 formed about the periphery of hole 56. Each spike 46 has a pointed end 62 disposable through hole 56 for engaging terrain 16 (FIG. 1). A spring 64 is disposed within pathway 52 between top section 48 and expanded end 60 of spike 46 urging pointed end 62 outwardly from foot member 42.

Figure 5:
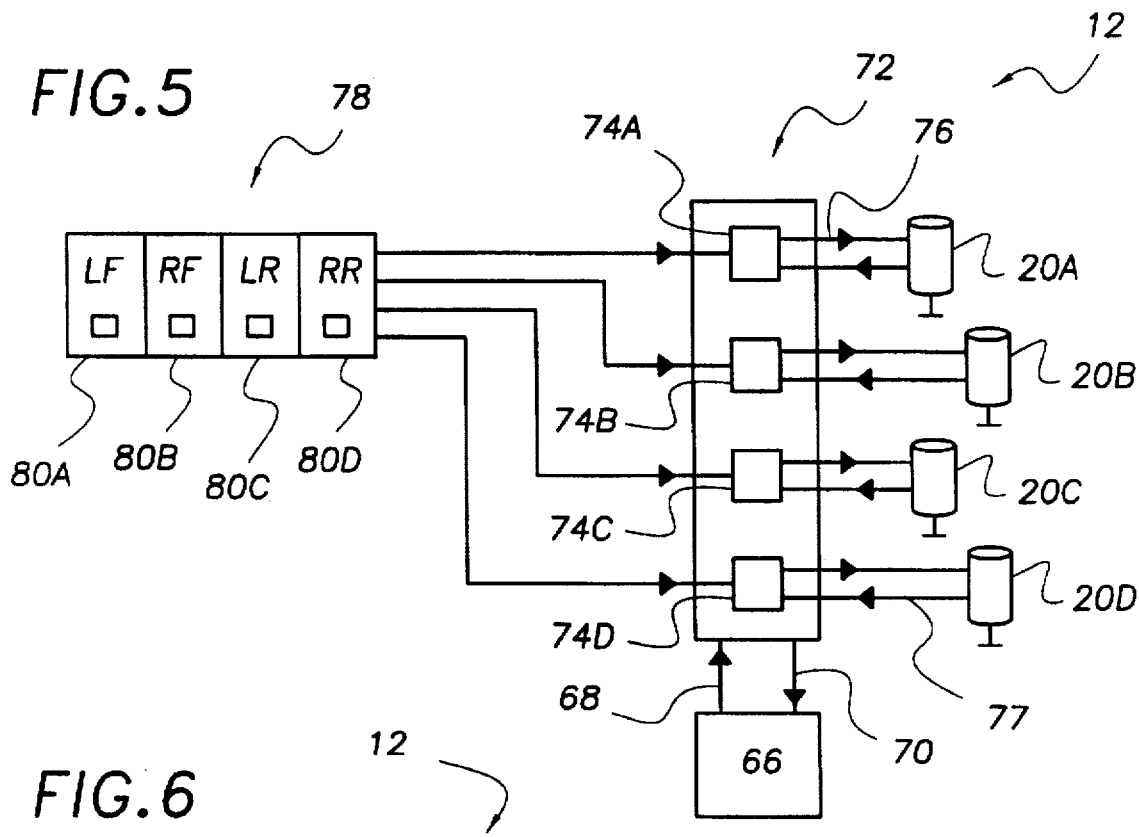
FIG. 5 is a diagrammatic illustration of the hydraulic jack system.

FIG. 5 is a diagrammatic illustration of hydraulic jack system 12. Jack system 12 includes a fluid control system comprising a hydraulic power unit 66, a hydraulic manifold 72 and an operator control unit 78.

Hydraulic power unit 66 provides hydraulic fluid under pressure through charge and return conduits 68, 70 for actuating hydraulic jacks 20. Hydraulic manifold 72 has four valve assemblies 74A, 74B, 74C and 74D for selectively extending and retracting one or more of jacks 20. Hydraulic manifold 72 is coupled in fluid communication between jacks 20 by a charge line 76 and a return line 77 and power unit 66 by charge and return conduits 68, 70.

Hydraulic power unit 66 is connected in bidirectional communication with manifold 72. Hydraulic power unit 66 is the hydraulic power steering system of vehicle 14 (FIG. 1), which uses the vehicle's engine for its power source. Hydraulic power unit 66 and manifold 72 act together as a fluid reservoir.

Operator control unit 78 is functionally connected to manifold 72 to controllably select or operate one or more of jacks 20. With a four-wheeled vehicle as depicted in FIG. 1, there is a left front jack (LF) 20A, a right front jack (RF) 20B, a left rear jack (LR) 20C and a right rear jack (RR) 20D. Each jack is assigned a corresponding select switch 80A, 80B, 80C and 80D of select unit 80. Select switches 80A, 80B, 80C and 80D selectively operate valve assemblies 74A, 74B, 74C and 74D of manifold 72 extending or retracting one or more of jack 20A, 20B, 20C and 20D.

Figure 6:
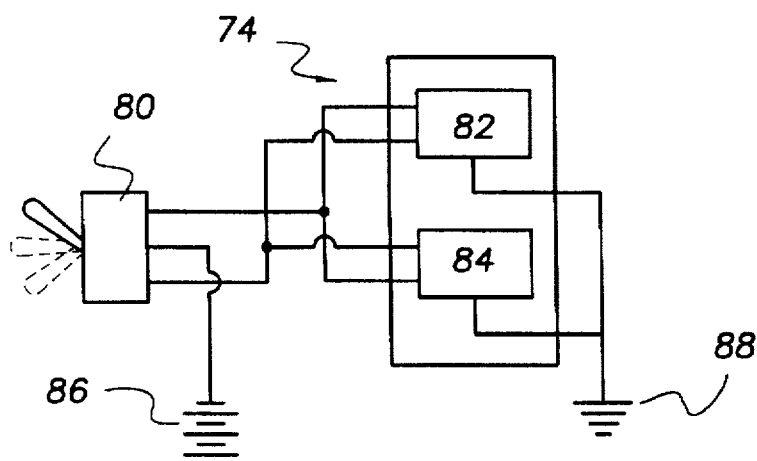
FIG. 6 is a diagrammatic illustration of the electrical connections present between a valve assembly and a vehicle battery.

FIG. 6 is a diagrammatic illustration of the electrical connections present between a valve assembly 74 and a vehicle battery 86 of hydraulic jack system 12. Valve assembly 74 includes an extend solenoid 82 and a retract solenoid 84, each solenoid 82, 84 including a valve. Solenoids 82, 84 are connected to a ground 88 and a three-position select switch 80 by unlabeled wires which allow solenoids 82, 84 to simultaneously operate in cooperation. Select switch 80 allows a user to raise, lower, or hold-fast a position of jack 12. Each valve assembly 74A, 74B, 74C and 74D is connected to a select switch 80A, 80B, 80C and 80D of control unit 78 (FIG. 5).

An example of operation is now described with reference to FIGS. 5 and 6. An extend solenoid 82 of a valve assembly 74 is actuated so as to connect charge line 76 to a jack 20 to charge conduit 68. Simultaneously, a retract solenoid 84 of the same valve assembly 74 is coupled to return line 77.

Such cooperation between solenoids 82, 84 facilitates the extension of jack 20.

Figure 7:
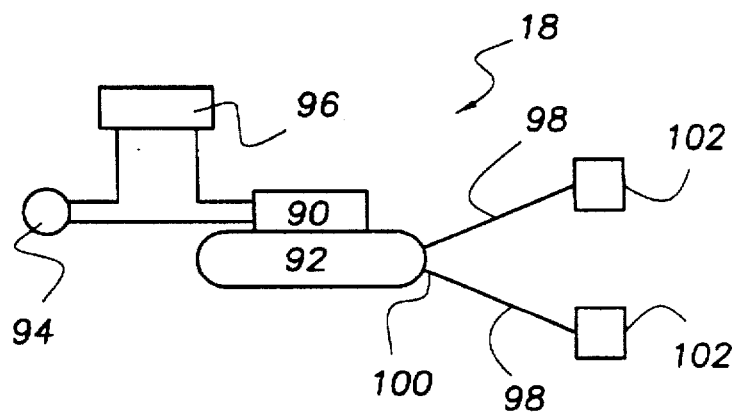
FIG. 7 is a diagrammatic illustration of the pneumatic system.

FIG. 7 is a diagrammatic illustration of pneumatic system 18. Pneumatic system 18 includes an air compressor 90 in communication with an air reservoir 92. The air compressor 90 and reservoir 92 are carried by the motor vehicle. Air compressor 90 is electrically connected to a battery 96 via a switch 94 to selectively operate air compressor 90. Pneumatic system 18 includes a pair of air hoses 98. Each air hose 98 having a first end 100 in fluid communication with air compressor 90 and air reservoir 92 and a second end carrying an air tool connector 102. As shown in FIG. 1, each air tool connector 102 is connected to an opposite side of vehicle 16. Air tool connectors 102 are quick-connect type connectors adapted for connecting an extension hose and air operated tools (not shown) for removing wheel lug nuts 104.

Use of the vehicle mounted tire changing system is now described with reference to FIGS. 1 through 7. Four hydraulic jacks 20 are mounted to the frame of vehicle 14, each jack 20 being mounted approximate a ground engaging wheel 22. Such arrangement allows vehicle 14 to be selectively elevated above terrain 16. Pneumatic system 18 provides an air tool connector on opposite sides of vehicle 14 for connecting an air operated tool for removing lug nuts 104.

It can be seen from the preceding description that a device for changing tires on a vehicle which has a hydraulic jack system having a plurality of hydraulic jacks mounted to a vehicle for lifting a portion of the vehicle relative to the supporting terrain, has a base connected to the jack that is pivotable relative to the jack, has a pneumatic system for connecting air operated tools, and has retractable spikes extending downwardly from the base for engaging the supporting terrain has been provided.

It is noted that the embodiment of the vehicle mounted tire changing system described herein in detail for exemplary purposes is of course subject to many different variations in structure, design, application and methodology. Because many varying and different embodiments may be made within the scope of the inventive concept (s) herein taught, and because many modifications may be made in the embodiment herein detailed in accordance with the descriptive requirements of the law, it is to be understood that the details herein are to be interpreted as illustrative and not in a limiting sense.

What is claimed is:

1. A vehicle mounted tire changing system comprising:

a plurality of hydraulic jacks mounted to a vehicle in a substantially vertical orientation relative to the supporting terrain for lifting a portion of said vehicle relative to the terrain;

a hydraulic power means coupled in communication with said hydraulic jacks for providing a hydraulic fluid under pressure to actuate said hydraulic jacks;

a hydraulic manifold having valve assemblies coupled in fluid communication between said hydraulic jacks and said hydraulic power means;

a control means for selectively activating said valve assemblies;

an air compressor electrically connected to a battery via a switch for selectively operating said air compressor;

a pair of air hoses each having a first end in fluid communication with said air compressor and a second end carrying an air tool connector means for operably connecting air operated tools thereto, said connector means being connected to opposite sides of said vehicle;

an outer cylinder for mounting to said vehicle;

an inner rod having a distal end, said inner rod operable to be hydraulically extended from and retracted into said outer cylinder; and a base connected to said distal end of said inner rod;

said base including a foot member having a circular side wall, a bottom section and a top section defining an interior therebetween; and a plurality of retractable spikes extending downwardly through said bottom section, each said retractable spike having an expanded end and a pointed end;

said foot member further including a plurality of tubes defining pathways therein, said tubes being vertically mounted within said interior between said top section and said bottom section, each said tube movably holding said expanded end of said retractable spike;

said bottom section forming a hole below each said pathway of said tube for disposing said pointed end of said retractable spike therethrough;

said base further including means for urging said pointed end of said retractable spike outwardly from said foot member, said urging means including a spring disposed within said pathway of said tube between said top section and said expanded end of said retractable spike.

2. The vehicle mounted tire changing system of claim 1, further including:

a socket member forming a socket therein mounted atop said top section of said foot member; and a ball extending from said distal end of said inner rod, said ball being rotatably disposed within said socket formed by said socket member in a manner such that said foot member is rotatable about said ball and pivotable relative to the longitudinal axis of said inner rod.

3. A vehicle mounted tire changing system comprising:

a plurality of hydraulic jacks mounted to a vehicle in a substantially vertical orientation relative to the supporting terrain for lifting a portion of said vehicle relative to the terrain;

a hydraulic power means coupled in communication with said hydraulic jacks for providing a hydraulic fluid under pressure to actuate said hydraulic jacks;

a hydraulic manifold having valve assemblies coupled in fluid communication between said hydraulic jacks and said hydraulic power means;

a control means for selectively activating said valve assemblies;

an air compressor electrically connected to a battery via a switch for selectively operating said air compressor;

a pair of air hoses each having a first end in fluid communication with said air compressor and a second end carrying an air tool connector means for operably connecting air operated tools thereto, said connector means being connected to opposite sides of said vehicle; and said hydraulic jack further comprising:

an outer cylinder for mounting to said vehicle;

an inner rod having a distal end, said inner rod operable to be hydraulically extended from and retracted into said outer cylinder;

a foot member comprising a circular side wall, a bottom section and a top section defining an interior therebetween; a plurality of tubes defining pathways therein, said tubes being vertically mounted within said interior between said top section and said bottom section, said bottom section forming a hole below each said pathway; a retractable spike having an expanded end movably held within each said tube and a pointed end disposable through said hole; and means disposed within said pathway of said tube between said top section and said expanded end of said retractable spike for urging said pointed end of said retractable spike outwardly from said foot member; and mechanical means, in mechanical connection between said inner rod and said foot member for pivotably connecting said foot member to said inner rod in a manner such that said foot member is rotatable about said ball and pivotable relative to the longitudinal axis of said inner rod.

4. The vehicle mounted tire changing system of claim 3, wherein:

said mechanical means includes:
- a socket member forming a socket therein mounted atop said top section of said foot member; and
- a ball extending from said distal end of said inner rod, said ball being rotatably disposed within said socket formed by said socket member in a manner such that said foot member is rotatable about said ball and pivotable relative to the longitudinal axis of said inner rod.

5. The vehicle mounted tire changing system of claim 4, wherein:

said urging means includes a spring.

6. The vehicle mounted tire changing system of claim 5, further including:

an air reservoir in fluid connection between said air compressor means and said first ends of said pair of air hoses.

7. The vehicle mounted tire changing system of claim 6, wherein:

four said retractable spikes extend from said foot member.

8. The vehicle mounted tire changing system of claim 3, wherein:

said vehicle includes a plurality of ground engaging wheels; and said hydraulic jack is adapted for mounting approximate said ground engaging wheels.

9. The vehicle mounted tire changing system of claim 7, wherein:

said vehicle includes a plurality of ground engaging wheels; and said hydraulic jack is adapted for mounting approximate said ground engaging wheels.

* * * * *